US008527269B1

(12) United States Patent
Kapur et al.

(10) Patent No.: US 8,527,269 B1
(45) Date of Patent: Sep. 3, 2013

(54) CONVERSATIONAL LEXICON ANALYZER

(75) Inventors: Amit R. Kapur, Marina Del Rey, CA (US); Steven F. Pearman, Redondo Beach, CA (US); James R. Benedetto, Hermosa Beach, CA (US)

(73) Assignee: Project Rover, Inc., Santa Monica, CA (US)

( * ) Notice: Subject to any disclaimer, the term of this patent is extended or adjusted under 35 U.S.C. 154(b) by 354 days.

(21) Appl. No.: 12/968,194

(22) Filed: Dec. 14, 2010

Related U.S. Application Data (60) Provisional application No. 61/286,507, filed on Dec. 15, 2009.

(51) Int. Cl.
*G06F 17/27* (2006.01)

(52) U.S. Cl.
USPC .......................................................... 704/235

(58) Field of Classification Search
USPC .......................................................... 704/235
See application file for complete search history.

(56) References Cited

U.S. PATENT DOCUMENTS

| | | | | |
|---|---|---|---|---|
| 6,275,789 | B1 * | 8/2001 | Moser et al. ...................... | 704/7 |
| 7,454,413 | B2 * | 11/2008 | Lakshminarayanan et al. ...... | 1/1 |
| 7,472,061 | B1 * | 12/2008 | Alewine et al. ................ | 704/243 |
| 7,957,969 | B2 * | 6/2011 | Alewine et al. ................ | 704/254 |
| 8,275,621 | B2 * | 9/2012 | Alewine et al. ................ | 704/260 |
| 8,346,563 | B1 * | 1/2013 | Hjelm et al. ................... | 704/275 |

OTHER PUBLICATIONS

Arrington, M., "Exclusive: Ex-MySpace Execs Launce Gravity Into Private Beta," TechCrunch, Dec. 16, 2009, 10 pages, [online] [retrieved on Jun. 24, 2011] Retrieved from the internet <URL:http://techcrunch.com/2009/12/16/exclusive-ex-myspace-execs-launch-gravity-into-private-beta/>.

Arrington, M., "Time to Meet Wavii, The Super Stealth, Super Awesome Startup Based in . . . Seattle?" TechCrunch, Jul. 21, 2010, 7 pages, [online] [retrieved on Jun. 24, 2011] Retrieved from the internet <URL:http://techcrunch.com/2010/07/21/time-to-meet-wavii-the-super-stealth-super-awesome-startup-based-in-seattle/>.

Kirkpatrick, M., "MySpace Preparing to go Beyond Friends in your News Feed ," Read Write Web, Aug. 3, 2010, 2 pages, [online] [retrieved on Jun. 24, 2011] Retrieved from the internet <URL:http://www.readwriteweb.com/archives/myspace_preparing_to_put_celebrity_news_in_your_ne.php>.

Kirkpatrick, M., "Hunch Relaunches as Internet Personalization Service," Read Write Web, Aug. 4, 2010, 2 pages, [online] [retrieved on Jun. 24, 2011] Retrieved from the internet <URL:http://www.readwriteweb.com/archives/hunch_internet_personalization_service.php>.

(Continued)

*Primary Examiner* — Susan McFadden
(74) *Attorney, Agent, or Firm* — Fenwick & West LLP (57) ABSTRACT

A system and a method for analyzing conversational data comprising colloquial or informal terms and having an informal structure. A corpus of training language maps, each associated with an entity, is generated from conversational data retrieved from sources previously associated with entities. Subsequently received conversational data is processed to generate a conversational language map which is compared to a plurality of the stored training language maps. A confidence value is generated describing the similarity of the conversational language map to each of the plurality of the stored training language maps. The entity associated with the training language map having the highest confidence value is then associated with the conversational language map.

20 Claims, 8 Drawing Sheets

(56) References Cited

OTHER PUBLICATIONS

Rao, R., "The long tail gets interesting," Fortune Tech, Dec. 15, 2009, 3 pages, [online] [retrieved on Jun. 24, 2011] Retrieved from the internet <URL: http://tech.fortune.cnn.com/2009/12/15/the-long-tail-gets-interesting/>.

Van Grove, J., "Google Revamps Google News," Mashable.com, Jun. 30, 2010, 5 pages, [online] [retrieved on Jun. 24, 2011] Retrieved from the internet <URL:http://mashable.com/2010/06/30/google-news/>.

Audiencescience, "Retargeting, Geographic Targeting, Geotargeting, Targeted Web Advertising," 2010, 3 pages, [online] [Archived on webarchive.org on Jul. 26, 2010] [Retrieved on Oct. 5, 2011] Retrieved from the internet <URL:http://web.archive.org/web/20100726044954/http://www.audiencescience.com/technology/advertisers>.

"Welcome to Audience Targeting!" AudienceScience.com, 3 pages, [online] [Archived on webarchive.org on Feb. 7, 2010] [retrieved on Nov. 9, 2011] Retrieved from the internet <URL:http://web.archive.org/web/20100207212603/http://audiencetargeting.com/>.

"Welcome to Audience Targeting!" AudienceScience.com, 1 page, [online] [Archived on webarchive.org on Jun. 18, 2009] [retrieved on Oct. 5, 2011] Retrieved from the internet <URL:http://web.archive.org/web/20090618131511/http://www.audiencetargeting.com/>.

BlueKai Data Exchange, 2010 2 pages [online] [Archived on webarchive.org on Aug. 19, 2010] [retrieved on Dec. 1, 2011] Retrieved from the internet <URL: http://http://web.archive.org/web/20100819140734/http://www.bluekai.com/solutions.html>.

BuzzFeed, Inc., "About BuzzFeed," 2009, 2 pages, [online] [Archived on webarchive.org on Feb. 26, 2009] [Retrieved on Oct. 5, 2011] Retrieved from the internet <URL:http://web.archive.org/web/20090226050950/http://www.buzzfeed.com/about>.

BuzzFeed, Inc., "About BuzzFeed," 2009, 3 pages, [online] [Archived on webarchive.org on Dec. 16, 2009] [Retrieved on Oct. 5, 2011] Retrieved from the internet <URL:http://web.archive.org/web/20091216093131/http://www.buzzfeed.com/about>.

Webpage for Chai Labs, 2010, 2 pages, [online] [Archived on webarchive.org on Jul. 6, 2010] [retrieved on Dec. 1, 2011] Retrieved from the internet <URL:http://web.archive.org/web/20100706072803/http://www.chailabs.com/platform/>.

Webpage for Collecta.com, 1 page [online] [Archived on webarchive.org on Dec. 1, 2009] [retrieved on Oct. 5, 2011] Retrieved from the internet <URL:http://web.archive.org/web/20091201040100/http://collecta.com/>.

Webpage for Collecta.com, 2 pages [online] [Archived on webarchive.org on Jul. 12, 2010] [retrieved on Nov. 9, 2011] Retrieved from the internet <URL:http://web.archive.org/web/20100712215014/http://collecta.com/>.

Daylife, "Daylife Overview," 3 pages, [online] [Archived on webarchive.org on Jul. 18, 2010] [Retrieved on Oct. 5, 2011] Retrieved from the internet <URL:http://web.archive.org/web/20100718062850/http://corp.daylife.com/overview/>.

Digg, Inc. "The Latest News Headlines, Videos and Images," Webpage for Digg.com, 2009, 2 pages, [online] [Archived on webarchive.org on Dec. 14, 2009] [Retrieved on Oct. 5, 2011] Retrieved from the internet <URL:http://web.archive.org/web/20091214120546/http://digg.com/>.

Digg, Inc. "The Latest News Headlines, Videos and Images," Webpage for Digg.com, 2010, 2 pages, [online] [Archived on webarchive.org on Aug. 4, 2010] [Retrieved on Dec. 1, 2011] Retrieved from the internet <URL:http://web.archive.org/web/20100804032222/http://digg.com/>.

Ellerdale, Inc., "The Ellerdale Project—Products" Webpage for Ellerdale.com, 3 Pages, [online] [Archived on webarchive.org on Jul. 25, 2010] [retrieved on Oct. 5, 2011] Retrieved from the internet <URL:http://web.archive.org/web/20100725150333/http://www.ellerdale.com/products.html>.

Exelate Media, "eXchange Behavioral Targeting Segments: 170M+ UV Strong," 2009, 1 Page, [online] [Archived on webarchive.org on Dec. 14, 2009] [retrieved on Dec. 1, 2011] Retrieved from the internet <URL:http://web.archive.org/web/20091214103616/http://www.exelate.com/new/buyers-targetingsegments.html>.

Exelate Media, "eXchange Behavioral Targeting Segments: 170M+ UV Strong," 2010, 1 Page, [online] [Archived on webarchive.org on Aug. 20, 2010] [retrieved on Dec. 1, 2011] Retrieved from the internet <URL: http://web.archive.org/web/20100820063641/http://www.exelate.com/new/buyers-targetingsegments.html>.

Flipboard Inc., "Flipboard for iPad," Webpage for Flipboard.com, 2010, 5 pages, [online] [Archived on webarchive.org on Aug. 1, 2010] [Retrieved on Oct. 5, 2011] Retrieved from the internet <URL:http://web.archive.org/web/20100801114228/http://www.flipboard.com/>.

Hawthorne Labs, "Apollo—The newspaper of the future," 2010, 2 pages [online] [Archived on webarchive.org on Aug. 8, 2010] [Retrieved on Oct. 5, 2011] Retrieved from the internet <URL:http://http://web.archive.org/web/20100808230643/http://hawthornelabs.com/>.

Hunch Inc., "How Hunch Works," 2009, 2 pages, [online] [Archived on webarchive.org on Nov. 26, 2009] [Retrieved on Oct. 5, 2011] Retrieved from the internet <URL:http://web.archive.org/web/20091126173555/http://www.hunch.com/info/how-hunch-works/>.

Hunch Inc., "How Hunch Works," 2010, 2 pages, [online] [Archived on webarchive.org on Jul. 2, 2010] [Retrieved on Oct. 5, 2011] Retrieved from the internet <URL:http://web.archive.org/web/20100702161009/http://hunch.com/info/how-hunch-works/>.

Webpage for Loud3R, 2010, 2 pages, [online] [Archived on webarchive.org on Aug. 17, 2010] [retrieved on Dec. 1, 2011] Retrieved from the internet <URL:http://web.archive.org/web/20100817062817/http://www.loud3r.com/solutions/>.

Mindset Media, LLC, Webpage for www.Mindset-Media.com, 1 page, [online] [Archived on webarchive.org on Mar. 18, 2009] [Retrieved on Oct. 5, 2011] Retrieved from the internet <URL:http://web.archive.org/web/20090318212800/http://www.mindset-media.com/>.

Mindset Media, LLC, Webpage for www.Mindset-Media.com, 1 page, [online] [Archived on webarchive.org on May 17, 2010] [Retrieved on Oct. 5, 2011] Retrieved from the internet <URL:http://web.archive.org/web/20100517131026/http://www.mindset-media.com/.

Webpage for mSpoke.com, 2008, 2 pages [online] [Archived on webarchive.org on Dec. 8, 2009] [retrieved on Dec. 1, 2011] Retrieved from the internet <URL:http://web.archive.org/web/20091208055908/http://www.mspoke.com/engine.html>.

Webpage for mSpoke.com, 2008, 2 pages [online] [Archived on webarchive.org on Aug. 17, 2010] [retrieved on Dec. 1, 2011] Retrieved from the internet <URL:http://web.archive.org/web/20100817171125/http://www.mspoke.com/engine.html>.

mSpoke Corporate Blog, 12 Pages, [online] [Archived on webarchive.org on Dec. 9, 2009] [retrieved on Dec. 1, 2011] Retrieved from the internet <URL:http://web.archive.org/web/20091209065447/http://www.mspoke.com/blog/?>.

mSpoke Corporate Blog, 12 Pages, [online] [Archived on webarchive.org on Aug. 26, 2010] [retrieved on Dec. 1, 2011] Retrieved from the internet <URL:http://web.archive.org/web/20100826024601/http://www.mspoke.com/blog/?>.

NewsCred Ltd. "NewsCred Platform—Intelligent Content Delivery System" Webpage for NewsCred, 2009, 2 pages, [online] [Archived on webarchive.org on May 4, 2010] [retrieved on Nov. 9, 2011] Retrieved from the internet <URL:http://web.archive.org/web/20100504125919/http://platform.newscred.com/>.

NewsCred Ltd. "NewsCred Platform—Intelligent Content Delivery System" Webpage for NewsCred, 2009, 2 pages, [online] [Archived on webarchive.org on Mar. 10, 2009] [retrieved on Nov. 9, 2011] Retrieved from the internet <URL:http://web.archive.org/web/20090310122902/http://platform.newscred.com/.

"OneRiot.com—Realtime Search for the Realtime Web," Webpage for OneRiot.com, 5 pages, [online] [Archived on webarchive.org on Oct. 27, 2009] [retrieved on Oct. 5, 2011] Retrieved from the internet <URL:http://web.archive.org/web/20091027005827/http://www.oneriot.com/>.

Onespot, "Demo—Videos & Live Widgets Demonstrate Story Linking & Scoring System," 4 pages, [online] [Archived on webarchive.

org on Jun. 2, 2009] [Retrieved on Oct. 5, 2011] Retrieved from the internet <URL:http://web.archive.org/web/20090602133717/http://www.onespot.com/demo/>.

Onespot, "Demo—Videos & Live Widgets Demonstrate Story Linking & Scoring System," 6 pages, [online] [Archived on webarchive.org on Jul. 10, 2010] [Retrieved on Oct. 5, 2011] Retrieved from the internet <URL:http://web.archive.org/web/20100710185330/http://www.onespot.com/demo/>.

Webpage for OpenCalais.com, Thomson Reuters, 2008, 2009, 3 pages, [online] [Archived on webarchive.org on Dec. 8, 2009] [retrieved on Oct. 5, 2011] Retrieved from the internet <URL:http://web.archive.org/web/20091208175653/http://www.opencalais.com/>.

Webpage for OpenCalais.com, Thomson Reuters, 2008, 2009, 2010, 2 pages, [online] [Archived on webarchive.org on Aug. 2, 2010] [retrieved on Oct. 5, 2011] Retrieved from the internet <URL:http://web.archive.org/web/20100802013437/http://www.opencalais.com/>.

Peerset Inc., "Peerset | the science of infinite connections," Webpage for Peerset.com, Peerset Inc. 2010, 1 page, [online] [Archived on webarchive.org on May 25, 2010] [retrieved on Oct. 5, 2011] Retrieved from the internet <URL:http://web.archive.org/web/20100525020133/http://www.peerset.com/>.

Peerset Inc., "Peerset | Social Psychographic," Webpage for Peerset.com, Peerset Inc. 2008, 1 page, [online] [Archived on webarchive.org on Feb. 7, 2009] [retrieved on Oct. 5, 2011] Retrieved from the internet <URL:Targetinghttp://web.archive.org/web/20090207070503/http://www.peerset.com/>.

Quantcast Corporation, "Quantcast—Marketer Overview," 2010, 1 page, [online] [Archived on webarchive.org on Oct. 2, 2010] [Retrieved on Oct. 5, 2011] Retrieved from the internet <URL:http://web.archive.org/web/20101002113816/http://www.quantcast.com/info/marketer-overview?>.

"Quantcast Audience—Quantcast Lookalikes," Quantcast, 2011, 1 page, [online] [retrieved on Jun. 24, 2011] Retrieved from the internet <URL:http://www.quantcast.com/info/lookalikes>.

"Resonate Networks—About Us," Webpage for Resonate Networks, Resonate Inc., 2010, 2 pages, [online] [Archived on webarchive.org on Aug. 23, 2010] [retrieved on Oct. 5, 2011] Retrieved from the internet <URL:http://web.archive.org/web/20100823091037/http://www.resonatenetworks.com/about-us/>.

Scoopler, Inc., Webpage for www.scoopler.com, 2009, 1 page, [online] [Archived on webarchive.org on Nov. 16, 2009] [Retrieved on Oct. 5, 2011] Retrieved from the internet <URL:http://web.archive.org/web/20091116075904/http://www.scoopler.com/>.

Scoopler, Inc., Webpage for www.scoopler.com, 2010, 1 page, [online] [Archived on webarchive.org on Aug. 8, 2010] [Retrieved on Oct. 5, 2011] Retrieved from the internet <URL:http://web.archive.org/web/20100801114258/http://www.scoopler.com/>.

"Sency—What's Going On?" Webpage for Sency.com, 2009, 1 page, [online] [Archived on webarchive.org on Dec. 2, 2009] [retrieved on Oct. 5, 2011] Retrieved from the internet <URL: http://web.archive.org/web/20091202104834/http://sency.com/?>.

"Sency—What's Going on?" Webpage for Sency.com, 2009-2010, 1 page, [online] [Archived on webarchive.org on Apr. 24, 2010] [retrieved on Oct. 5, 2011] Retrieved from the internet <URL: http://web.archive.org/web/20100424101538/http://sency.com/>.

Solariat, "The Science Behind Solariat," 2010, 1 page, [online] [Archived on webarchive.org on Aug. 16, 2010] [retrieved on Dec. 1, 2011] Retrieved from the internet <URL:http://web.archive.org/web/20100816113817/http://www.solariat.com/science.php>.

StumbleUpon, "StumbleUpon's Recommendation Technology," 3 pages, [online] [Archived on webarchive.org on Feb. 23, 2009] [Retrieved on Oct. 5, 2011] Retrieved from the internet <URL:http://web.archive.org/web/20090223130608/http://www.stumbleupon.com/technology/>.

StumbleUpon, "StumbleUpon's Recommendation Technology," 3 pages, [online] [Archived on webarchive.org on Jul. 22, 2010] [Retrieved on Oct. 5, 2011] Retrieved from the internet <URL:http://web.archive.org/web/20100722091213/http://www.stumbleupon.com/technology/>.

"Topicfire—News," Webpage for Topicfire.com, 4 pages, [online] [Archived on webarchive.org on Dec. 14, 2009] [retrieved on Oct. 5, 2011] Retrieved from the internet <URL:http://web.archive.org/web/20091214173100/http://topicfire.com/>.

"Topicfire • Real-time ranked news," Webpage for Topicfire.com, 5 pages, [online] [Archived on webarchive.org on Aug. 9, 2010] [retrieved on Oct. 5, 2011] Retrieved from the internet <URL:http://web.archive.org/web/20100809125831/http://topicfire.com/>.

Webpage for Topsy.com, Topsy Labs, Inc., 2010, 1 page, [online] [Archived on webarchive.org on Aug. 13, 2010] [retrieved on Oct. 5, 2011] Retrieved from the internet <URL:http://web.archive.org/web/20100813025948/http://topsy.com/>.

Webpage for Topsy.com, Topsy Labs, Inc., 2009, 1 page, [online] [Archived on webarchive.org on Nov. 15, 2009] [retrieved on Oct. 5, 2011] Retrieved from the internet <URL:http://web.archive.org/web/20091115114504/http://topsy.com/>.

Wikipedia, "Collaborative filtering," Last Modified Jun. 12, 2009, 6 pages [online] [Archived on webarchive.org on Jun. 24, 2009] [Retrieved on Oct. 5, 2011] Retrieved from the internet <URL:http://web.archive.org/web/20090624064202/http://en.wikipedia.org/wiki/Collaborative_Filtering>. http://web.archive.org/web/20100210043441/http://en.wikipedia.org/wiki/Collaborative_filtering.

Wikipedia, "Collaborative filtering," Last Modified Feb. 9, 2010, 6 pages [online] [Archived on webarchive.org on Feb. 10, 2010] [Retrieved on Oct. 5, 2011] Retrieved from the internet <URL:http://web.archive.org/web/20100210043441/http://en.wikipedia.org/wiki/Collaborative_filtering>.

"Wowd real-time search: Discover what's popular right now," Webpage for Wowd.com, Wowd Inc., 1 page, [online] [Archived on webarchive.org on Aug. 8, 2010] [retrieved on Oct. 5, 2011] Retrieved from the internet <URL:http://web.archive.org/web/20100808023337/http://www.wowd.com/>.

"Wowd: Discover what's popular on the web," Webpage for Wowd.com, Wowd Inc., 1 page, [online] [Archived on webarchive.org on Nov. 8, 2009] [retrieved on Oct. 5, 2011] Retrieved from the internet <URL:http://web.archive.org/web/20091108121553/http://www.wowd.com/>.

"Zemanta—The best semantic API for Tags, Link and Pictures," Zemanta Ltd., 2006-2009, 2 pages, [online] [Archived on webarchive.org on Jul. 24, 2010] [retrieved on Oct. 5, 2011] Retrieved from the internet <URL:http://web.archive.org/web/20100724051910/http://www.zemanta.com/api/>.

"Zemanta—The best semantic API for Tags, Link and Pictures," Zemanta Ltd., 2009, 2 pages, [online] [Archived on webarchive.org on May 1, 2009] [retrieved on Oct. 5, 2011] Retrieved from the internet <URL:http://web.archive.org/web/20090501022352/http://www.zemanta.com/api/>.

* cited by examiner

CONVERSATIONAL LEXICON ANALYZER

CROSS REFERENCE TO RELATED APPLICATIONS

This application claims the benefit of U.S. Provisional Application No. 61/286,507, filed Dec. 15, 2009, which is incorporated by reference in its entirety.

BACKGROUND

1. Field of Art

The disclosure generally relates to the field of language processing, and more specifically, to analyzing conversational data.

2. Description of the Related Art

The goal of language processing is to understand language data, such as paragraphs of text on a website. Most existing applications of language processing are focused on determining the subject matter of or type of content addressed by language data. However, determining the subject matter of language data provides no insight about the entity providing or interacting with the language data. Conventional language processing techniques are thus limited in their abilities to identify an entity associated with the language data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium analyzes conversational data to identify an entity associated with the conversational data. For example, an entity which provided the conversational data is identified. The "conversation data" or "conversational data" comprises data including colloquial terms or informal terms used by entities, such as categories of person.

In one embodiment, conversational data is retrieved from one or more sources, which are each associated with one or more entities or groups of entities, and analyzed to initially generate a corpus of training language maps, each associated with an entity or associated with a group of entities. To generate the corpus, training conversation data including colloquial terms, informal terms or having an informal structure, is obtained from sources which are previously associated with different entities or groups of entities. Example sources for the training conversation data include social networks (e.g., websites such as FACEBOOK), social streams (e.g., websites such as TWITTER), Internet forums/message boards, online message groups (e.g., GOOGLE groups), comments on a web page, captured audio data or any other source including colloquial or informal terms. The training data is processed to generate a training language map which describes lexical features of the training data, and the training language map is associated with the entity associated with the source from which the training data was obtained and the training language map is then stored in the corpus.

After training, subsequently received conversation data is processed to generate a conversational language map. Confidence values between the conversational language map and different training language maps are generated by comparing the conversational language map to different training language maps stored in the corpus. The entity associated with the training language map resulting in a highest relative confidence value is associated with the conversational language map to indicate an entity likely to have provided the conversation data.

Computing Machine Architecture

Figure 1:
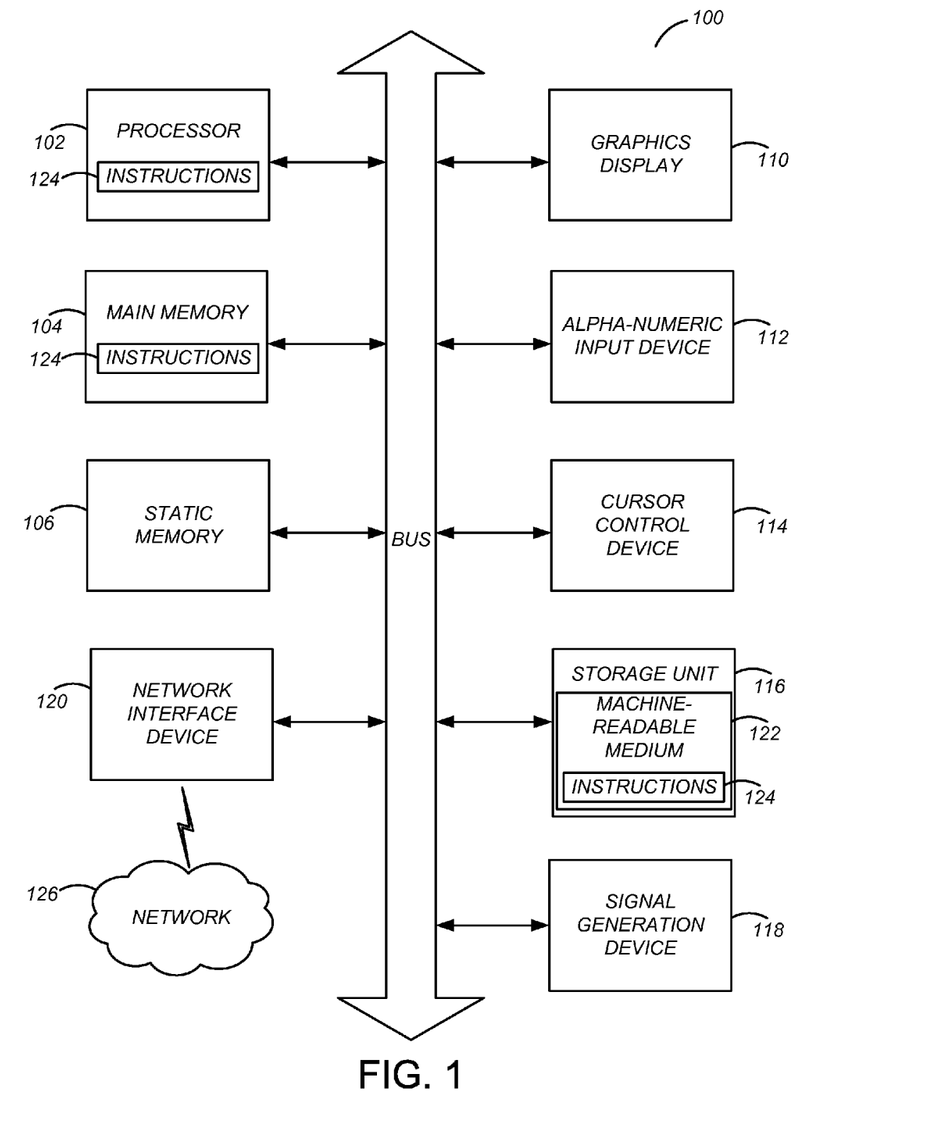
FIG. 1 illustrates one embodiment of components of an example machine able to read instructions from a machine-readable medium and execute them in a processor or controller.

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium (or machine-reachable storage medium) 122 on which is stored instructions 124 (e.g., software) embodying any one or more of the methodologies or functions described herein (e.g., FIGS. 2-8). The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Lexicon Analysis System Overview

Figure 2:
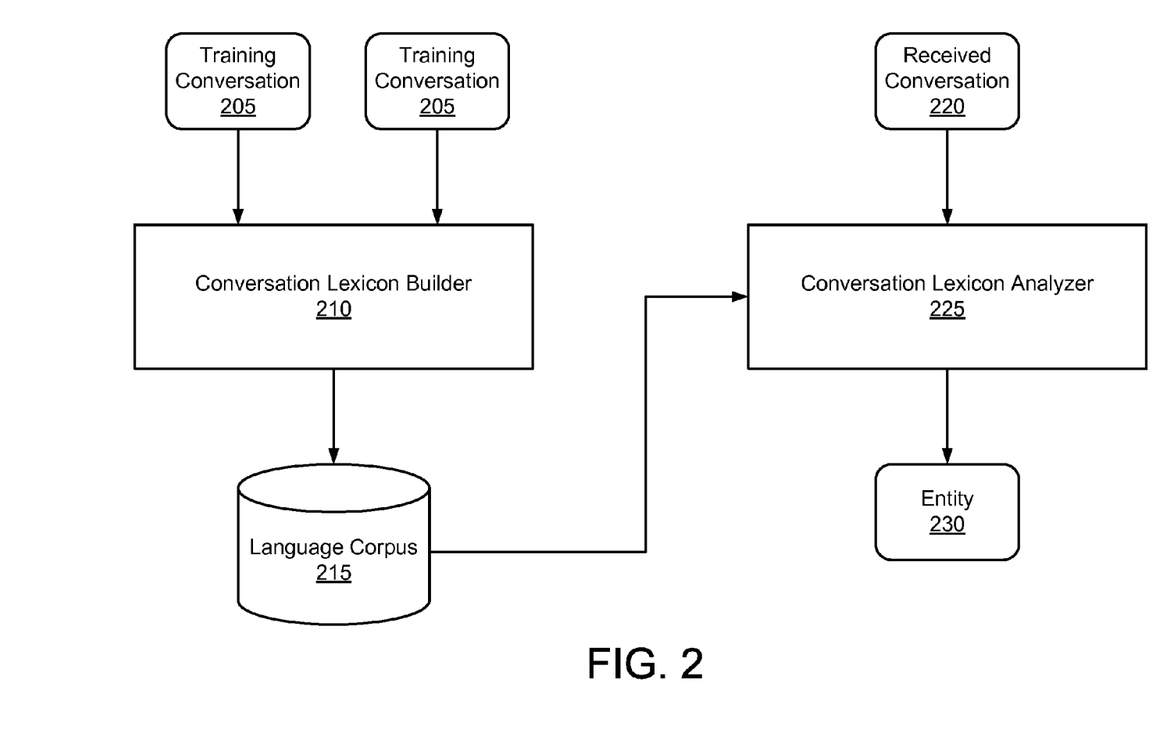
FIG. 2 illustrates a high-level block diagram of one embodiment of a conversational lexicon analysis system.

FIG. 2 illustrates a high-level block diagram of one embodiment of a conversational lexicon analysis system. For purposes of illustration, FIG. 2 divides operation of the lexical analysis system into two types, training and analysis. However, in various embodiments, these types of operation may occur in conjunction with each other. In an embodiment, the conversational lexicon analysis system is implemented by a computing system 100, as described above in conjunction with FIG. 1.

During training, a conversation lexicon builder 210 obtains training conversation data 205 from a variety of sources. The training conversation data 205 comprises data including colloquial terms or informal terms used by entities such as categories of persons (e.g., mothers, surfers, skiers, etc.). Examples of sources include social networks (e.g., websites such as FACEBOOK), social streams (e.g., websites such as TWITTER), Internet forums/message boards, groups, comments on a web page, captured audio data or any other source including colloquial or informal terms. The sources of training conversation data 205 are each associated with a predetermined, or previously identified, entity or group of entities. For example, to jumpstart the training process, an administrator of the lexicon analysis system may have previously associated the message forum located at www.babyforum.com with the entity for mothers. Thus, when the system retrieves training conversation data 205 from www.babyforum.com, it automatically knows that the conversation data has been received from persons who are likely to be mothers.

Training conversation data 205 is processed to identify a set of lexical features of the data and to generate a training language map associated with the entity, or group of entities, associated with the source of the training conversation data. The training language map includes lexical feature or attributes associated with the entity, or group of entities. For example, phrases, expressions or word orderings are included in the training language map to identify characteristics of the training conversation data from the source previously associated with an entity. The training language map is not restricted to any particular form of language map, and in one embodiment may be structured as a language graph. The training language map is stored with an identifier of the associated entity, generating a corpus 215 which includes a plurality of training language maps each associated with one or more entities. Training is further described below in conjunction with FIG. 4.

After generating the corpus, received conversation data 220 is analyzed to associate an entity with the received conversation data 220. In one embodiment, the conversation data 220 is captured from data received by a host, such as posts or entries to a social network, social stream, or message board. Alternatively, conversation data 220 is retrieved from one or more sources, such as online stores of answers, online comments, online forums or other sources which receive or store conversation data 220, allowing active acquisition of conversation data 220. A conversation language map is generated by processing the conversation data to identify lexical features of the conversation data. The conversation language map is compared to a plurality of training language maps stored in the corpus to determine a confidence value between the conversation data and each of the plurality of training language maps. An entity 230 is associated with the conversation data by identifying the entity 230 associated with the training language map resulting in the highest confidence value between the conversation data and the training language map. Analysis of received conversation data is further described below in conjunction with FIGS. 8 and 9.

Figure 3:
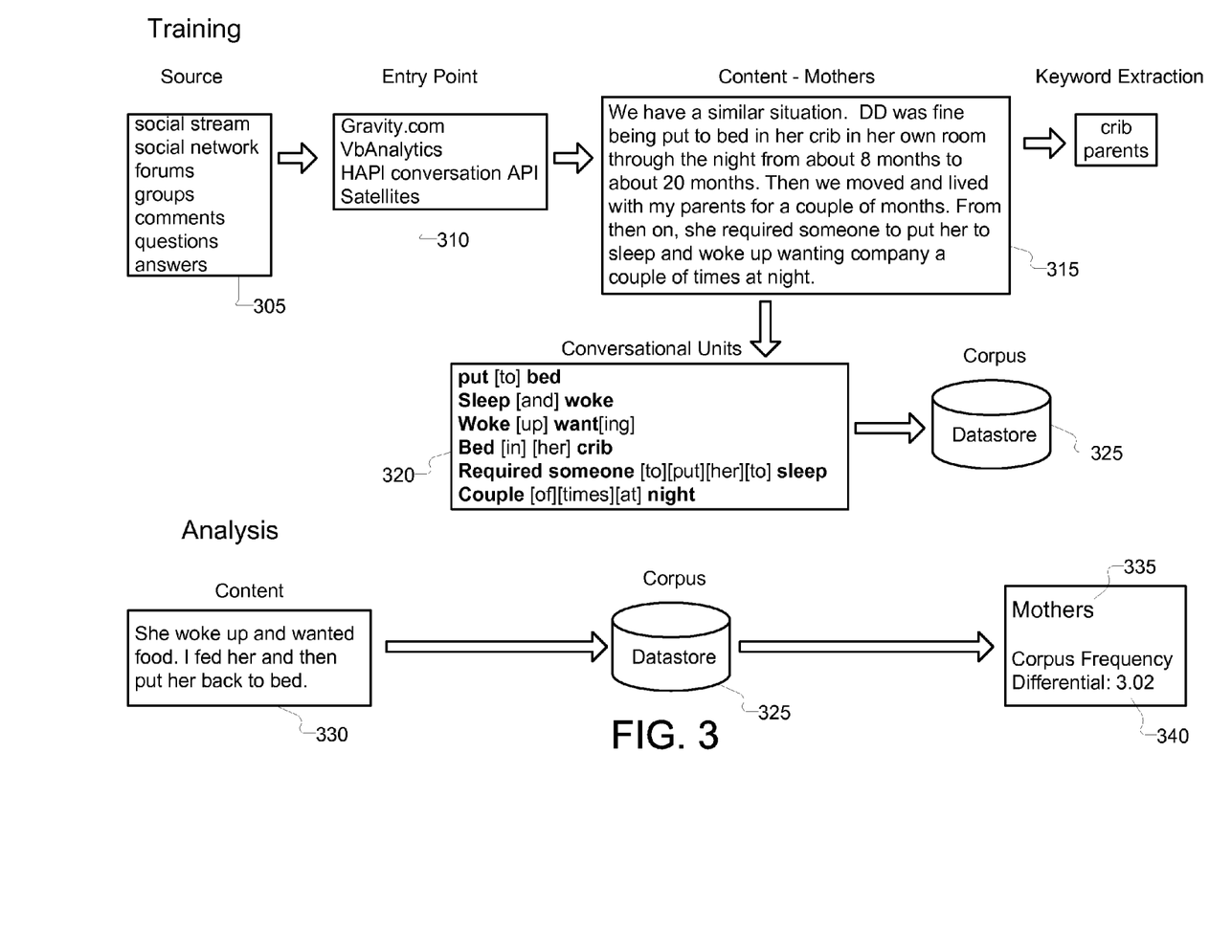
FIG. 3 illustrates an example of training a conversational lexicon analysis system and subsequent analysis of received conversational data by the conversational lexicon analysis system.

FIG. 3 illustrates an example of training a conversational lexicon analysis system and subsequent analysis of received conversational data by the conversational lexicon analysis system. In the example shown by FIG. 3, training conversation data 315 is received from one or more sources 305 associated with "mothers." Hence, the conversational lexicon analysis system determines lexical attributes or characteristics of conversational data from mothers in FIG. 3. The training conversation data 315 is obtained from one or more sources 305 which have previously been determined or identified as including conversational data 315 supplied by mothers. For example, message boards involving parenting, online question and answer repositories about parenting, or messages associated with a parenting group in a social network are example sources of training conversation data 315. In various embodiments, the training data 315 is retrieved from the sources using a web crawler, or similar method 310 for retrieving data from one or more online sources 305.

After receiving the training conversation data 315, the conversational lexicon analysis system generates a training language map comprising various conversation units 320. In the example shown by FIG. 3, the training conversation units 320 describe lexical features, characteristics or attributes of the training conversation data 315 such as "put bed," "bed crib," "woke want." Hence, the conversation units 320 in FIG. 3 identify lexical characteristics or attributes associated with data 315 provided by mothers. One or more conversation units 320 are included in the training language map, which is stored in a corpus 325 along with an identifier describing the entity associated with the training language map, which is "mothers" in the example of FIG. 3. This process can be repeated for conversation data received from different entities, generating a diverse corpus 325 of different training language maps, each associated with one or more entities. Training of the lexicon analysis system is further described below in conjunction with FIG. 4.

After storing training language maps in the corpus, the conversational lexicon analysis system analyzes received data 330 to associate an entity with the received data 330. In the example of FIG. 3, the conversational lexicon analysis system receives conversation data 330 from a host coupled to the lexicon analysis system, such as a web site or other online service provider receiving conversational data. A conversation language map is generated from the received data and compared to the corpus 325 to identify a training language map from the corpus 325 most similar to the conversation language map. Generation of the conversation language map and determination of the training language map most similar to the conversation map is further described below in conjunction with FIG. 8. In the example of FIG. 3, the conversational lexicon analysis system determines that the training language map in the corpus associated with "mothers" includes lexical features most similar to lexical features extracted from the received conversation 330 "She woke up and wanted food. I fed her and then put her back to bed." Hence, the conversational lexicon analysis system associates the received conversation 330 with "mothers," 335 indicating that the entity providing the received conversation is likely a mother.

In one embodiment, a confidence value 340 is generated between the conversation language map and a plurality of training language maps, and the training language map having the highest relative confidence value 340 is determined to be most similar to the conversation language map. Hence, the entity associated with the training language map having the highest relative confidence value is associated with the conversation. This enables the conversational lexicon analysis system to identify an entity, such as a person or group of people, most likely to have provided the conversation data. Analysis of received conversation data is further described below in conjunction with FIG. 8.

System Training

Figure 4:
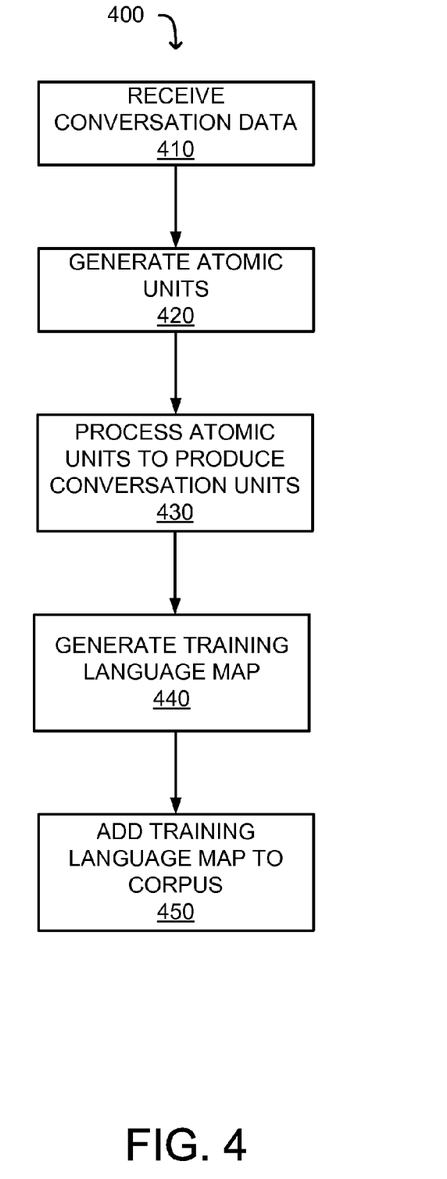
FIG. 4 illustrates a flow chart of one embodiment of a method for training a conversational lexical analysis system.

FIG. 4 illustrates a flow chart of a method 400 for training a conversational lexicon analysis system. In an embodiment, the steps depicted in the method shown in FIG. 4 are implemented by instructions for performing the described actions. The instructions are embodied or stored within a machine-readable medium 122, such as a main memory 104 or a storage unit 116 memory. In addition, the instructions are executable by a processor 102. Those of skill in the art will recognize that the method may be implemented in embodiments of hardware and/or software or combinations thereof. Those of skill in the art will recognize that other embodiments can perform the steps of FIG. 4 in different orders or include different and/or additional steps than the ones described herein.

Initially, conversational training data is received 410 from one or more sources, which are each previously associated with an entity, or group of entities. Examples of sources include social networks, social streams, Internet forums/message boards, online comments, online question and answer repositories, transcripts of dialogs, audio data captured from a conversation or similar data sources. As an example, conversation data is received 410 from an online forum associated with cat owners, or from a question and answer website associated with parenting. The conversational training data includes colloquial and/or informal expressions and may have an informal structure.

The conversational lexicon analysis system generates 420 atomic units from the received conversational training data. The atomic units are segments of data from within the conversational training data. For example, if the conversational training data is text data, the atomic units are text strings parsed from the text conversation training data. In one embodiment, the conversational lexicon analysis system receives a web page including conversational training data, such as a forum page, identifies that the web page includes conversational data based on data from the web page, such as HyperText Markup Language (HTML) elements within the web page, and parses the included conversation into one or more text strings to generate 420 atomic units. For example, many forum pages are created with PHP scripts that produce structured HTML web-pages. Certain HTML elements in the page are indicative of the text of a forum post, whereas other HTML elements are indicative of other types of data, such as a time or date. Knowing this information, the conversational lexicon analysis system can analyze HTML elements within a forum page to identify conversational text.

The atomic units are processed 430 to produce a set of conversation units. In one embodiment, Porter stemming is applied to different atomic units, to modify words within the atomic units into a standardized form. For example, the root of words within an atomic unit is determined and used to form the conversation unit, so that variations of a word, such as "working," "worked" and "works" are modified into a common format, such as "work." In an embodiment, after application of Porter stemming, the resulting data is parsed into conversation units, such as n-grams comprising various groups of one or more words from the atomic units being processed 430. Various techniques may be used parse the data into conversation units. In one embodiment, data is parsed into conversation units using structural elements within the data to separate the conversation units. For example, punctuation marks (e.g., the marks: . , ; : ), action verbs, or passive verbs can be used to separate one conversation unit from another. In one embodiment, data is parsed into as many conversation units as possible. For example, the sentence "I work out" can be parsed into conversation units "I," "work," "out," "I work," "work out" and "I work out."

A training language map is then generated 440 from the conversation units. In one embodiment, generating 440 a language map comprises reducing the conversation units to identify conversation units that are relatively unique or important to the conversational training data while eliminating commonly appearing conversation units that do not provide any meaningful information. For example, conversation units "the" "of" and "so" do not provide any meaningful information about the entity providing these conversational units, and would thus be removed. As a result, the training language map includes conversation units more closely associated with the entity that produced the conversational training data.

Conversation units can be reduced in any of a number of ways. In one embodiment, conversation units that are statistically important to the received data are first identified. For example, reducing conversation units may include calculating a frequency with which the conversation unit appears in the received data and removing conversation units that fall below a threshold frequency. Frequency can be, for example, an approximation of the number of times a conversation unit appears in the data divided by the total number of words in the data.

In another embodiment, commonly used conversation units are discarded because they provide little meaningful information. For example, reducing conversation units may include removing conversation units that appear in a blacklist of common words/phrases. As another example, reducing conversation units includes removing conversation units that overlap with and frequently occur in data previously stored in the corpus, such as other language maps in the corpus.

In yet another embodiment, reducing conversation units includes comparing the frequency of each conversation unit in the received data to the frequency of the conversation unit in a plurality of language maps stored in the corpus, such as using Term Frequency Inverse Document Frequency (TF-IDF), and removing statistically irrelevant conversation units. Any one of these techniques, either alone or in combination with other techniques, and performed in any order, can be used to reduce the conversation units.

In one embodiment, generating 440 a training map also comprises associating an attachment score with each conversation unit. The attachment score indicates the strength of the relationship between the conversation unit and the entity from which the received training data was received, and can be determined from a statistical analysis of the received training data. For example the attachment score can be the frequency of the conversation unit in the training data or a TF-IDF weight calculated for the conversation unit.

The resulting training language map, which includes lexical attributes indicative of data received from an entity, is added 450 to the corpus in association with the entity that produced the data. Hence, the corpus includes a plurality of training language maps, each associated with a different entity. For example, the corpus includes a training language map associated with mothers, a training language map associated with pet owners and additional training language maps associated with other entities.

Figure 5A:
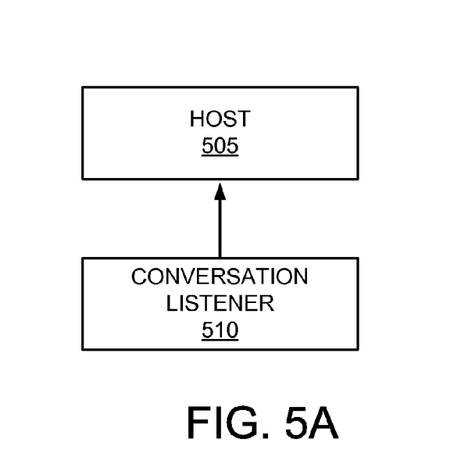
FIG. 5A illustrates one embodiment of a system for obtaining conversational data to analyze by a conversational lexical analysis system or to train a conversational lexical analysis system.

FIG. 5A illustrates one embodiment of a system for obtaining conversational data for analysis by a conversational lexicon analysis system or for training a conversational lexical analysis system. The system shown by FIG. 5A captures conversational data from a host 505 using a conversation listener 510. The host comprises a web site or other online service which receives streams of data, such as social networking messages (e.g., FACEBOOK updates), forum entries, posts, comments or other conversational data. The conversation listener 510 is coupled to the host 505 and analyzes data from the host to determine whether the data is conversational data or includes conversational data. Conversational data identified by the conversation listener 510 is analyzed by the conversational lexicon analysis system or is used to train the conversational lexicon analysis system. In one embodiment, the conversation listener 510 determines that received data includes conversational data based on components within the received data, such as HyperText Markup Language (HTML) elements within a web page.

In an embodiment, the conversation listener 510 is implemented by instructions for performing the actions described above. The instructions are embodied or stored within a machine-readable medium 122, such as a main memory 104 or a storage unit 116 memory. The instructions are executable by a processor 102. Those of skill in the art will recognize that the method may be implemented in embodiments of hardware and/or software or combinations thereof.

Figure 5B:
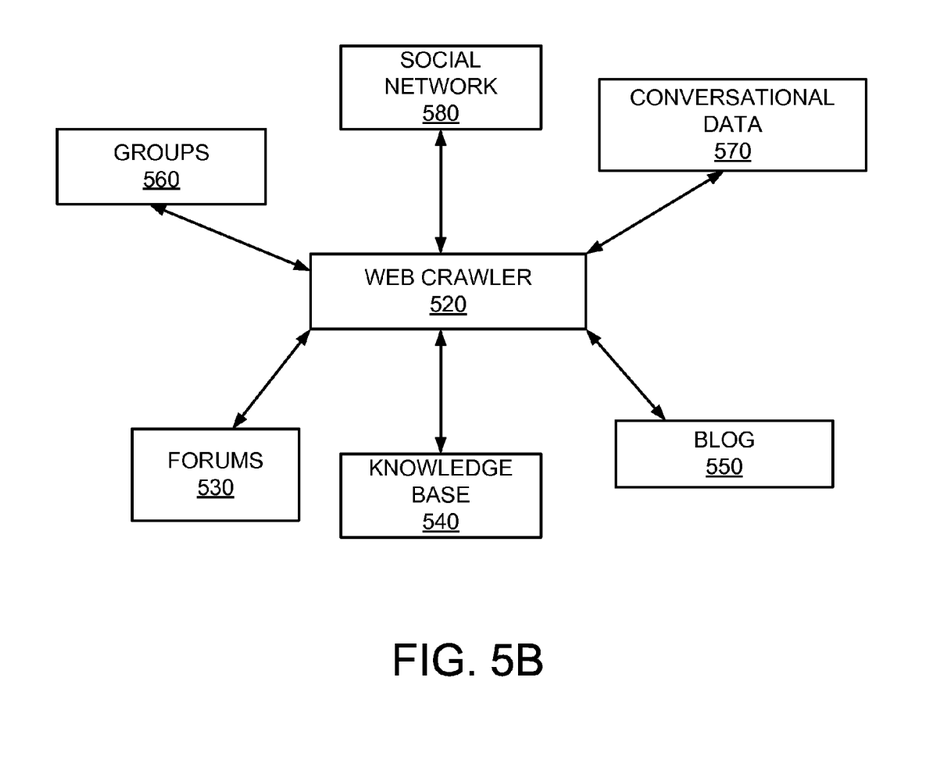
FIG. 5B illustrates one embodiment of a system for obtaining conversational data to train a conversational lexical analysis system or to analyze by a conversational lexical analysis system.

FIG. 5B illustrates an alternative embodiment a system for obtaining conversational data to train a conversational lexicon analysis system or to analyze using the conversational lexicon analysis system. The system shown by FIG. 5B retrieves conversational data from various sources, enabling the conversational lexicon analysis system to actively retrieve conversational data. In the embodiment shown by FIG. 5B, a web crawler 520 accesses online sources and determines whether the online sources include conversational data. For example, the web crawler 520 accesses one or more forums 530, knowledge bases 540, blogs 550, websites associated with a group 560, social network 580 or other sources of conversational data 570. The web crawler 520 is coupled to a network, enabling access to the different sources. In one embodiment, the web crawler 520 determines that a source includes conversational data based on data within an accessed source, such as HyperText Markup Language (HTML) elements within a web page.

In an embodiment, the web crawler 520 is implemented by instructions for performing the actions described above. The instructions are embodied or stored within a machine-readable medium 122, such as a main memory 104 or a storage unit 116 memory. In addition, the instructions are executable by a processor 102. Those of skill in the art will recognize that the method may be implemented in embodiments of hardware and/or software or combinations thereof.

Figure 6:
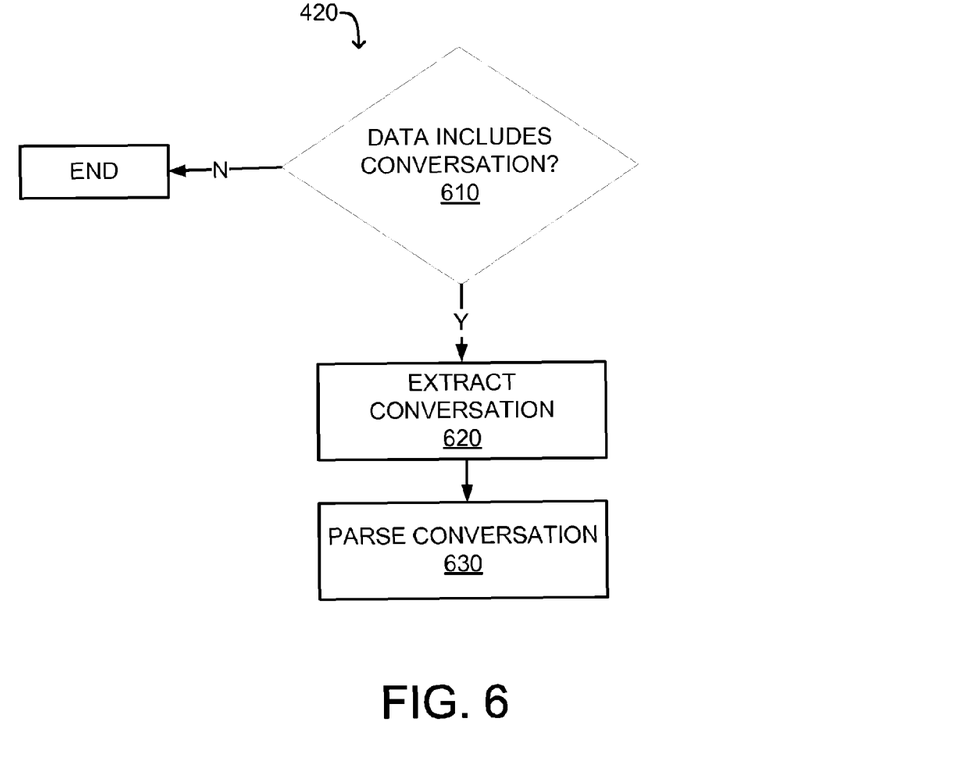
FIG. 6 illustrates one embodiment of a method for generating atomic units from received conversational data.

FIG. 6 illustrates one embodiment of a method for generating 420 atomic units from received conversational data. In an embodiment, the steps depicted in the method shown in FIG. 6 are implemented by instructions for performing the described actions embodied or stored within a machine-readable medium 122, such as a main memory 104 or a storage unit 116 memory, which are executable by a processor 102. Those of skill in the art will recognize that the method may be implemented in embodiments of hardware and/or software or combinations thereof. Those of skill in the art will recognize that other embodiments can perform the steps of FIG. 6 in different orders or include different and/or additional steps than the ones described herein.

The conversational lexicon analysis system determines 610 whether received data includes conversation data. For example, the conversational lexicon analysis system determines 610 that received data includes conversational data based on elements within the received data, such as HyperText Markup Language (HTML) elements or components within a received web page. If it is determined 610 that the received data does not include a conversation, the process ends.

However, responsive to determining 610 that received data includes a conversation, the conversational data is extracted 620 from the received data. This allows subsequent analysis of conversational data while reducing the data that is analyzed by separating the conversational data from non-conversational data. The extracted conversation is then parsed 630 into atomic units, such as text strings for subsequent processing.

Figure 7:
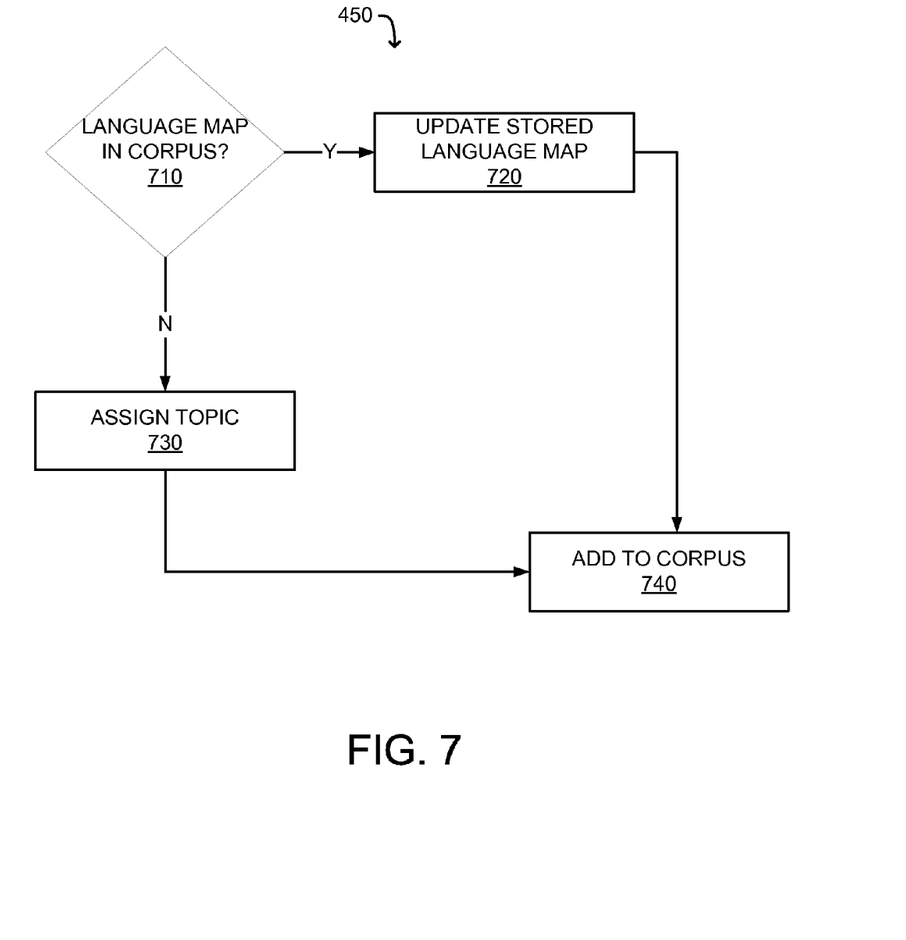
FIG. 7 illustrates one embodiment of a method for modifying a corpus of training language maps using received conversational data.

FIG. 7 illustrates one embodiment of a method for adding 450 a training language map to a corpus. In an embodiment, the steps depicted in the method shown in FIG. 7 are implemented by instructions for performing the described actions. The instructions are embodied or stored within the machine-readable medium 122, such as the main memory 104 or the storage unit 116 memory. Further, the instructions are executable by the processor 102. Those of skill in the art will recognize that the method may be implemented in embodiments of hardware and/or software or combinations thereof. Those of skill in the art will recognize that other embodiments can perform the steps of FIG. 7 in different orders or include different and/or additional steps than the ones described herein.

As an initial matter, a corpus contains a plurality of training language maps, each of which is associated with an entity and assigned to one or more topics. In one embodiment, the corpus is part of an ontology. The ontology is a data graph including a plurality of nodes and edges that connect the nodes. Each node represents a particular topic, for example "surfing" or "wakeboarding." Nodes are connected by edges that represent the relationships between multiple topics. For examples, the topics of surfing and wakeboarding can both be linked to the topic of extreme sports though an edge in the data graph. The edge can further indicate the type of relationship between one topic and another, such as whether one topic is a sub-topic of another topic. For example, surfing and wakeboarding can be linked to extreme sports through an edge in the interest graph indicating that surfing and wakeboarding are sub-topics of extreme sports.

Each training map in the corpus is assigned to one or more topics. For example, the training language map associated with the entity "surfers" may be assigned to the topic of "surfing." Each training language map may also be assigned to more than one topic. For example, the training language map associated with the entity "surfers" may also be assigned to the topic of "wetsuits."

In one embodiment, the conversational lexicon analysis system determines 710 whether a language map already exists in the corpus for the entity from which the data was received. Language maps that already exist in the corpus have previously been assigned to one or more topics. Thus, responsive to determining 710 that the training language map is included in the corpus, the existing language map is updated 720 using the received data. More specifically, the existing language map is updated using the generated language map for the received data. For example, if data is received for the entity "surfers" and a language map for "surfers" already exists in the corpus, the existing language map for "surfers" would be updated accordingly. The updated training language map is stored 760 in the corpus.

However, responsive to determining 710 that the generated training language map is not included in the corpus, the conversational lexicon analysis system assigns 730 one or more topics to the language map. In one embodiment, the topic is manually assigned 730 based on a user input specifying the topic. Alternatively, a topic is automatically assigned 730 from data stored within the corpus or data obtained from an external source. For example, a new language map for the entity "surfers" may closely match several existing language maps that are already assigned to the topic of "surfing." Because there is a close match, the "surfers" language map is also assigned to the topic of "surfing." Once the topic is assigned 730, the generated language map is added 740 to the corpus.

Analysis of Conversational Data

Figure 8:
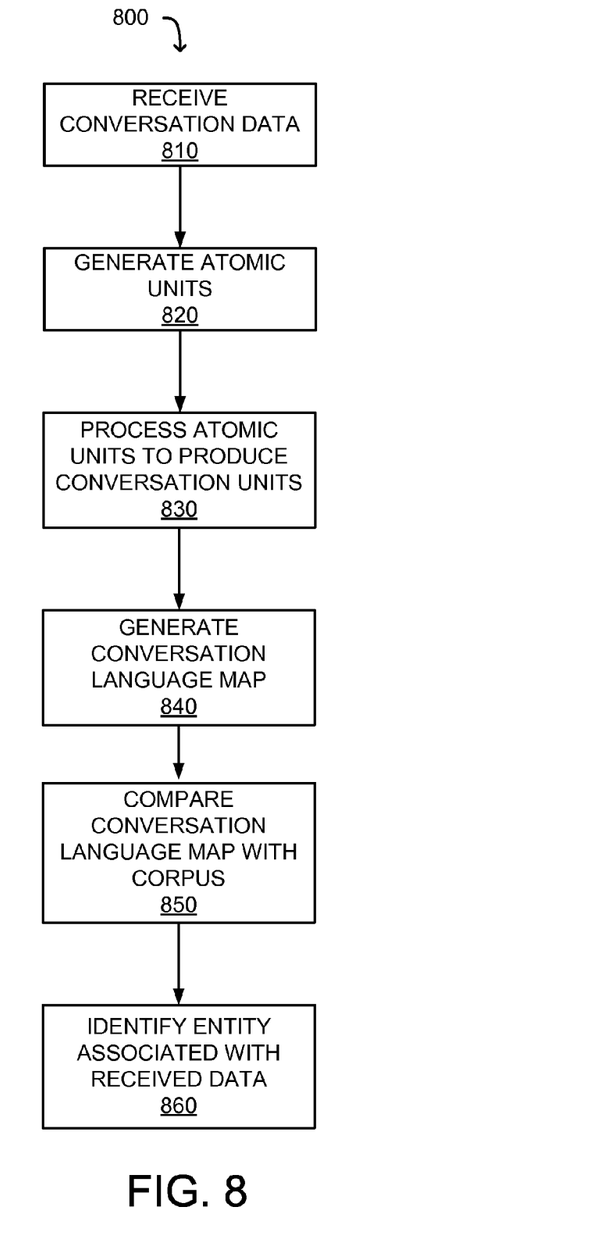
FIG. 8 illustrates one embodiment of a method identifying an entity associated with the received data.

FIG. 8 illustrates one embodiment of a method 800 for analyzing received data to identify an entity associated with the received data. In an embodiment, the steps depicted in the method shown in FIG. 8 are implemented by instructions for performing the described actions embodied or stored within the machine-readable medium 122, such as the main memory 104 or the storage unit 116 memory, which are executable by the processor 102. Those of skill in the art will recognize that the method may be implemented in embodiments of hardware and/or software or combinations thereof. Those of skill in the art will recognize that other embodiments can perform the steps of FIG. 8 in different orders or include different and/or additional steps than the ones described herein.

Initially conversational data is received 810 from a source. For example, conversational data is captured and identified by the conversation listener 510 or conversational data is retrieved from a source by the web crawler 520. The received conversational data includes colloquial or informal expressions and may have an informal structure.

The conversational lexicon analysis system generates 820 atomic units, which are segments of data from within the conversational data. For example, if the conversational data is text data, the atomic units comprise text strings. In one embodiment, the conversational lexicon analysis system receives a web page including conversational data, such as a forum page, from the web crawler 520, identifies that the received web page includes conversational data by analyzing elements within the web page, such as HyperText Markup Language (HTML), and parses the included conversation into one or more text strings.

The atomic units are then processed 830 to produce a set of conversation units. In one embodiment, Porter stemming is applied to the atomic units to modify words within the atomic units into a standardized form. For example, the root of words within an atomic unit is determined and used to form the conversation unit, so that variations of a word are replaced with the root of the word. Hence, terms such as "working," "worked" and "works" are replaced by the corresponding root word of "work," to provide a common format. In an embodiment, after application of Porter stemming, the resulting data is parsed into N-grams so that the conversation units comprise various groups of one or more words.

A conversation language map is then generated 840 from the conversation units. In one embodiment, generating 840 a conversation language map comprises reducing the conversation units to identify conversation units that are relatively unique to the conversational data while eliminating commonly appearing conversation units that do not provide any meaningful information. For example, conversation units "the" "of" and "so" do not provide any meaningful information about the entity providing these conversational units, and would thus be removed. As a result, the language map includes conversation units more closely associated with the entity that produced the conversational data.

Conversation units can be reduced in any of a number of ways, similar to how conversation units are reduced when generating a training language map. In one embodiment, reducing conversation units includes calculating a frequency with which the conversation unit appears in the received data and removing conversation units that fall below a threshold frequency. Frequency can be, for example, the number of times a conversation unit appears in the data divided by the total number of words in the data. In another embodiment, reducing conversation units includes removing conversation units that appear in a blacklist of common words/phrases. In another embodiment, reducing conversation units includes removing conversation units that overlap with and frequently appear in data previously stored in the corpus.

In one embodiment, reducing conversation units includes comparing the frequency of each conversation unit in the received data to the frequency of the conversation unit in other language maps stored in the corpus, such as using Term Frequency Inverse Document Frequency (TF-IDF). Application of TF-IDF allows determination of how important a conversation unit is to the conversation language map. When TF-IDF analysis is used, the importance of a conversation unit increases proportionally to the number of times the conversation unit appears in the received conversation data but the importance is offset by the frequency at which the conversation unit appears in the corpus. Any one of these techniques, either alone or in combination with other techniques can be used to reduce the conversation units.

In one embodiment, after conversation units are reduced, attachment scores are associated with each of the remaining conversation units to generate 840 a conversation language map. An attachment score indicates the importance of a conversation unit in the received data. In one embodiment, the attachment score is determined from a statistical analysis of the received data. For example the attachment score can be the frequency of the conversation unit in the conversational data or a TF-IDF weight calculated for the conversation unit.

The conversation language map is compared 850 to a plurality of training language maps and a confidence value is computed for each comparison. The confidence levels represent a similarity between the conversation language map and each of the plurality of training language maps. Because each training language map is associated with an entity, the similarity between the conversation language map and a training language map indicates the likelihood that the entity associated with the training language map provided the conversational data. In one embodiment, the confidence level is computed by multiplying, for each conversation unit in the conversation language map, the attachment score of the conversation unit in the conversation language map with the corresponding attachment score in the training language map. For example, if the phrase "paddle out" has a high attachment score in both the conversation language map and a training language map, the confidence level is also likely to be high.

In one embodiment, the confidence values are used to identify 860 an entity associated with the received conversational data. In an embodiment, the highest relative confidence value is determined and the entity associated with the training language map resulting in the highest relative confidence value is identified 860 as the entity providing the received conversational data. The entity can then be associated with the received conversational data.

Through use of training language maps, the conversational lexicon analysis system is thus able to more accurately identify the entity associated with received conversational data. In particular, the training language maps contain information about colloquial uses of words, which provides additional context for identifying the entity behind received conversational data. Once identified, the entity can be provided with more targeted information, such as personalized content with greater context. For example, conversational data received from a particular person can be analyzed to determine that the person is a mother. Knowing that this person is a mother enables personalized content (e.g., filtering of social streams, targeted advertisements, news articles, etc) to be delivered to this person that mothers would be interested in. Further, the content itself can be analyzed to determine the entity associated with the content, providing an indication of what the content is about, which can then be used to deliver the content to persons that are interested in this type of content.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein, for example, those described in FIGS. 3-9. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein (e.g., in FIGS. 2-8) may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for determining an entity, such as a person, from which conversational data originates through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for analyzing conversational data, the method comprising:
   receiving first conversational data that is produced by an entity, the conversational data received from a source that is associated with the entity, the entity comprising a category of persons;
   identifying a first set of lexical features from the first conversational data, the first set of lexical features comprising groups of one or more words from the first conversational data;
   reducing, by a computer, the first set of lexical features based on a frequency of lexical features in the first conversational data and also based on overlaps between lexical features in the first set and lexical features in a corpus of language maps, the corpus comprising a plurality of language maps that are associated with different entities;
   generating a first language map based on the reduced set of lexical features; and
   storing the first language map into the corpus in association with the entity.

2. The method of claim 1, further comprising
   receiving second conversational data that is produced by an unknown entity;
   identifying a second set of lexical features from the second conversational data;
   generating a second language map based on the second set of lexical features;
   computing confidence scores for a plurality of training language maps in the corpus by comparing the second language map to the corpus; and
   identifying the entity associated with the language map having the highest confidence score as the entity of the second conversational data.

3. A computer implemented method for analyzing conversational data, the method comprising:
   receiving first conversational data that is produced by an entity;
   identifying a first set of lexical features from the first conversational data;
   reducing, by a computer, the first set of lexical features to generate a first language map; and
   storing the first language map into a corpus of language maps in association with the entity, the corpus comprising a plurality of language maps that are associated with different entities.

4. The method of claim 3, wherein receiving first conversational data that is produced by an entity comprises receiving first conversational data from a source associated with the entity.

5. The method of claim 3, wherein an entity comprises a category of persons.

6. The method of claim 3, wherein first conversational data comprises colloquial terms used by the entity.

7. The method of claim 3, wherein lexical features comprise conversation units that are groups of one or more words, and identifying the first set of lexical features comprises identifying conversation units based on word stems in the first conversational data.

8. The method of claim 3, wherein reducing the first set of lexical features to generate a first language map comprises reducing the first set of lexical features based a frequency of lexical features in the first conversational data.

9. The method of claim 3, wherein reducing the first set of lexical features to generate a first language map comprises reducing the first set of lexical features based on overlaps between lexical features in the first set and lexical features in the corpus.

10. The method of claim 3, wherein reducing the first set of lexical features to generate a first language map comprises:
    identifying attachment scores for the first set of lexical features, each attachment score representing a strength of a relationship between a lexical feature and the entity; and
    adding the attachment scores to the first language map.

11. The method of claim 3, wherein storing the first language map into the corpus comprises updating an existing language map that was previously stored in the corpus in association with the entity.

12. The method of claim 3, further comprising:
    receiving second conversational data produced by an unknown entity;
    identifying a second set of lexical features from the second conversational data;
    generating a second language map based on the second set of lexical features;
    comparing the second conversation language map to the corpus of language maps to identify a language map that best matches the second language map; and
    identifying the entity associated with the language map that best matches the second language map as the entity of the second conversational data.

13. The method of claim 12, wherein generating a second language map comprises reducing the second set of lexical features.

14. The method of claim 12, wherein comparing the conversational language map to the corpus comprises:
    computing confidence scores for a plurality of training language maps in the corpus; and
    identifying the training language map with the highest confidence score.

15. A computer program product for analyzing conversational data, the computer program product comprising a non-transitory computer-readable medium containing instructions, the instructions executable by one or more processors for:
    receiving first conversational data that is produced by an entity, the conversational data received from a source that is associated with the entity, the entity comprising a category of persons;
    identifying a first set of lexical features from the first conversational data, the first set of lexical features comprising groups of one or more words from the first conversational data;
    reducing the first set of lexical features based on a frequency of lexical features in the first conversational data and also based on overlaps between lexical features in the first set and lexical features in the corpus;
    generating a first language map based on the reduced set of lexical features; and
    storing the first language map into the corpus in association with the entity.

16. The computer program product of claim 15, the instructions further executable by the one or more processors for:
    receiving second conversational data that is produced by an unknown entity;
    identifying a second set of lexical features from the second conversational data;
    generating a second language map based on the second set of lexical features;

computing confidence scores for a plurality of training language maps in the corpus by comparing the second language map to the corpus; and identifying the entity associated with the language map having the highest confidence score as the entity of the second conversational data.

17. A computer program product for analyzing conversational data, the computer program product comprising a non-transitory computer-readable medium containing instructions, the instructions executable by one or more processors for:

receiving first conversational data that is produced by an entity;

identifying a first set of lexical features from the first conversational data;

reducing the first set of lexical features to generate a first language map; and storing the first language map into a corpus of language maps in association with the entity, the corpus comprising a plurality of language maps that are associated with different entities.

18. The computer program product of claim 17, wherein reducing the first set of lexical features to generate a first language map comprises reducing the first set of lexical features based a frequency of lexical features in the first conversational data.

19. The computer program product of claim 17, wherein reducing the first set of lexical features to generate a first language map comprises reducing the first set of lexical features based on overlaps between lexical features in the first set and lexical features in the corpus.

20. The computer program product of claim 17, the instructions further executable by the one or more processors for:

receiving second conversational data produced by an unknown entity;

identifying a second set of lexical features from the second conversational data;

generating a second language map based on the second set of lexical features;

comparing the second conversation language map to the corpus of language maps to identify a language map that best matches the second language map; and identifying the entity associated with the language map that best matches the second language map as the entity of the second conversational data.

* * * * *